United States Patent
Korhonen

(10) Patent No.: US 8,295,415 B2
(45) Date of Patent: Oct. 23, 2012

(54) INTERFERENCE CHARACTERISATION AND REMOVAL

(75) Inventor: Juha Olavi Korhonen, Cambridge (GB)

(73) Assignees: MStar Semiconductor, Inc. (KY); MStar Software R&D, Ltd., Shenzhen (CN); MStar France SAS, Issy les Moulineaux (FR); MStar Semiconductor, Inc. (TW)

( * ) Notice: Subject to any disclaimer, the term of this patent is extended or adjusted under 35 U.S.C. 154(b) by 971 days.

(21) Appl. No.: 11/792,233

(22) PCT Filed: Nov. 30, 2005

(86) PCT No.: PCT/GB2005/004576
§ 371 (c)(1),
(2), (4) Date: Mar. 12, 2008

(87) PCT Pub. No.: WO2006/059088
PCT Pub. Date: Jun. 8, 2006

(65) Prior Publication Data
US 2009/0129445 A1 May 21, 2009

(30) Foreign Application Priority Data
Dec. 2, 2004 (GB) ................................ 0426548.4

(51) Int. Cl.
*H04K 1/10* (2006.01)

(52) U.S. Cl. ........ 375/346; 375/130; 375/140; 375/141; 375/152; 375/260; 375/295

(58) Field of Classification Search .......... 370/335, 370/342, 441; 375/130, 140, 141, 152, 260, 375/295, 346
See application file for complete search history.

(56) References Cited

U.S. PATENT DOCUMENTS

| | | | | |
|---|---|---|---|---|
| 5,852,630 A * | 12/1998 | Langberg et al. | ............. | 375/219 |
| 6,426,983 B1 | 7/2002 | Rakib et al. | | |
| 6,490,267 B1 | 12/2002 | Kim et al. | | |
| 6,552,996 B2 * | 4/2003 | Kim et al. | ..................... | 370/209 |
| 6,707,847 B1 * | 3/2004 | Yoneyama | ..................... | 375/150 |
| 6,813,258 B2 | 11/2004 | Hans et al. | | |
| 7,174,356 B2 | 2/2007 | Agami et al. | | |
| 7,224,721 B2 * | 5/2007 | Betz et al. | ..................... | 375/152 |
| 7,313,114 B2 * | 12/2007 | Karjalainen | ................. | 370/335 |
| 7,379,489 B2 * | 5/2008 | Zuniga et al. | ................. | 375/130 |
| 2002/0154615 A1 | 10/2002 | Hans et al. | | |

FOREIGN PATENT DOCUMENTS

| | | |
|---|---|---|
| EP | 0993127 A1 | 4/2000 |
| EP | 1 460 813 A1 | 9/2004 |
| GB | 2 351 422 A | 12/2000 |
| JP | 2003-087219 | 3/2003 |
| TW | 419912 | 1/2001 |
| TW | 595144 | 6/2004 |
| WO | 02/01733 A2 | 1/2002 |
| WO | WO 2004/010591 A2 | 1/2004 |

* cited by examiner

*Primary Examiner* — Dhaval Patel

(74) *Attorney, Agent, or Firm* — Edell, Shapiro & Finnan, LLC

(57) ABSTRACT

A method of evaluating the usage in a received signal of codes from a tree of codes that can be used to orthogonalise communications signals, the method including testing to determine if a given code is in use in the received signal and deducing from the result and from the tree structure the need to test in the received signal for the use of the codes in the portion of the tree depending from said given code. The invention also includes corresponding apparatus and software.

4 Claims, 4 Drawing Sheets

INTERFERENCE CHARACTERISATION AND REMOVAL

This application is a National Phase of PCT/GB2005/004576, filed Nov. 30, 2005, which claims priority to United Kingdom application GB 0426548.4, filed Dec. 2, 2004, each of which are hereby incorporated by reference.

This invention can be used to reduce interference that hampers the performance of User Equipment (UE) receivers in CDMA systems that employ Orthogonal Variable Spreading Factor (OVSF) codes (see, for example, 3GPP TS 25.213, Spreading and modulation (FDD), Release 5). Interference is a major problem for CDMA systems, the capacity of the system is directly related to the level of interference in it. It is clear that by reducing the amount of interference in the CDMA system, it is possible to improve its performance.

BACKGROUND OF THE INVENTION

OVSF codes are designed so that in an ideal environment time synchronised signals that have been spread with OVSF codes do not interfere with each other. However, in practical (non-ideal) environments the orthogonality of these codes is never perfect because:
1. In frequency selective wideband channels the channel delay spread causes multiple delayed replicas of the same transmitted signal to arrive at the receiver. This is owing to obstacles in the environment giving rise to signal reflection and diffraction causing multipath propagation delay, which destroys orthogonality.
2. Even if the cell environment would not cause multipaths, in systems employing multiple transmit antennas these antennas typically introduce several multipath components with fractional chip delay offsets.

Therefore also systems that employ OVSF codes suffer from intercode interference. In some systems, such as Multiple-Input Multiple-Output (MIMO) systems (see, for example, Huang H., Sandell M., Viswanathan H., "Achieving high data rates on the UMTS downlink shared channel using multiple antennas," 3G Mobile Communication Technologies Conference, London, March 2001, *IEE Conference Publication No.* 477, pp. 373-379). This interference can seriously harm the performance of the receiver.

SUMMARY OF THE INVENTION

A well-known technique to reduce interference already employed in many systems is Joint Detection (JD), or Multi-User Detection (MUD) (see, for example, Verdu, S., Multiuser Detection, Cambridge University Press, Cambridge, UK, 1998). However, MUD is normally used in the base station to improve the estimation of uplink signals. MUD in CDMA requires the knowledge of the spreading codes, but this is no problem for the base station since the network itself has assigned these codes earlier, and thus it knows them.

MUD techniques are typically not used in the UE receiver in the downlink because the UE does not have the knowledge of other users' spreading codes. In most systems the number of available spreading codes is so large that an exhaustive search using all of them is not possible in UE receivers which have limited power and processing capacities. For example in the 3GPP FDD system downlink it is possible to use spreading factors 4, 8, 16, 32, 64, 128, 256, and 512. This means that there are 1020 different spreading codes that could be in use. Another reason why MUD is not widely studied in the downlink is that most systems, such as UMTS with its OVSF codes, are designed so that in theory there is no such interference in the downlink a MUD scheme could remove. However, as shown earlier, this is not true in practice.

According to one aspect, the invention provides a method of evaluating the usage in a received signal of codes from a tree of codes that can be used to orthogonalise communications signals, the method comprising testing to determine if a given code is in use in the received signal and deducing from the result and from the tree structure the need to test in the received signal for the use of codes in the portion of the tree depending from said given code.

In certain embodiments, the codes in the tree are OVSF codes.

In certain embodiments, if the code under test is deemed to be in use, then all of the codes in its dependent subtree are deemed to be blocked from use.

In certain embodiments, the code under test is tested by being correlated with the received signal in order to determine whether that code is used in the received signal.

In certain embodiments, the tree structure permits the deduction of whether the codes in the portion of the tree depending from the code under test are blocked from use in the received signal.

In certain embodiments, the tree structure permits the deduction of whether the codes in the portion of the tree depending from the code under test are unused. Such a deduction can be made with assistance from, for example, knowledge of the power levels associated with different layers of the tree.

In certain embodiments, a tested code that is deemed to be used in the received signal is used to subtract from the received signal that part of the received signal that is attributable to that code. This can assist with, for example, interference cancellation in the case where the code under test is a potential interferer of another code that is known to be used in the received signal and that is desired to be demodulated.

In certain embodiments, the method continues with the testing of other codes in the tree, to ascertain whether those codes are in use in the received signal. Of course, the testing of the further codes need not comprehend the testing of any subtrees for which testing has been deemed unnecessary and, moreover, the testing of the further codes can give rise to the identification, in the same manner as before, of further subtrees that do not require testing.

The method described above can be performed by dedicated hardware (such as an ASIC) or by programmable or configurable hardware (such as a general purpose data processor or an FPGA). Of course, the invention also consists in software for causing data processing equipment to perform the methods described above.

The present invention provides a method which has the potential to enable a UE receiver to efficiently identify interfering spreading codes using the knowledge of the underlying code structure, and to remove the interference these codes cause in the receiver. This method has the potential to significantly improve the performance of UE receivers in CDMA systems, and especially in MIMO systems where there is large amount of noise caused by orthogonal codes.

BRIEF DESCRIPTION OF THE DRAWINGS

By way of example, some embodiments of the invention will now be described by reference to the accompanying figures, in which.

DESCRIPTION OF THE EMBODIMENTS

Figure 1:
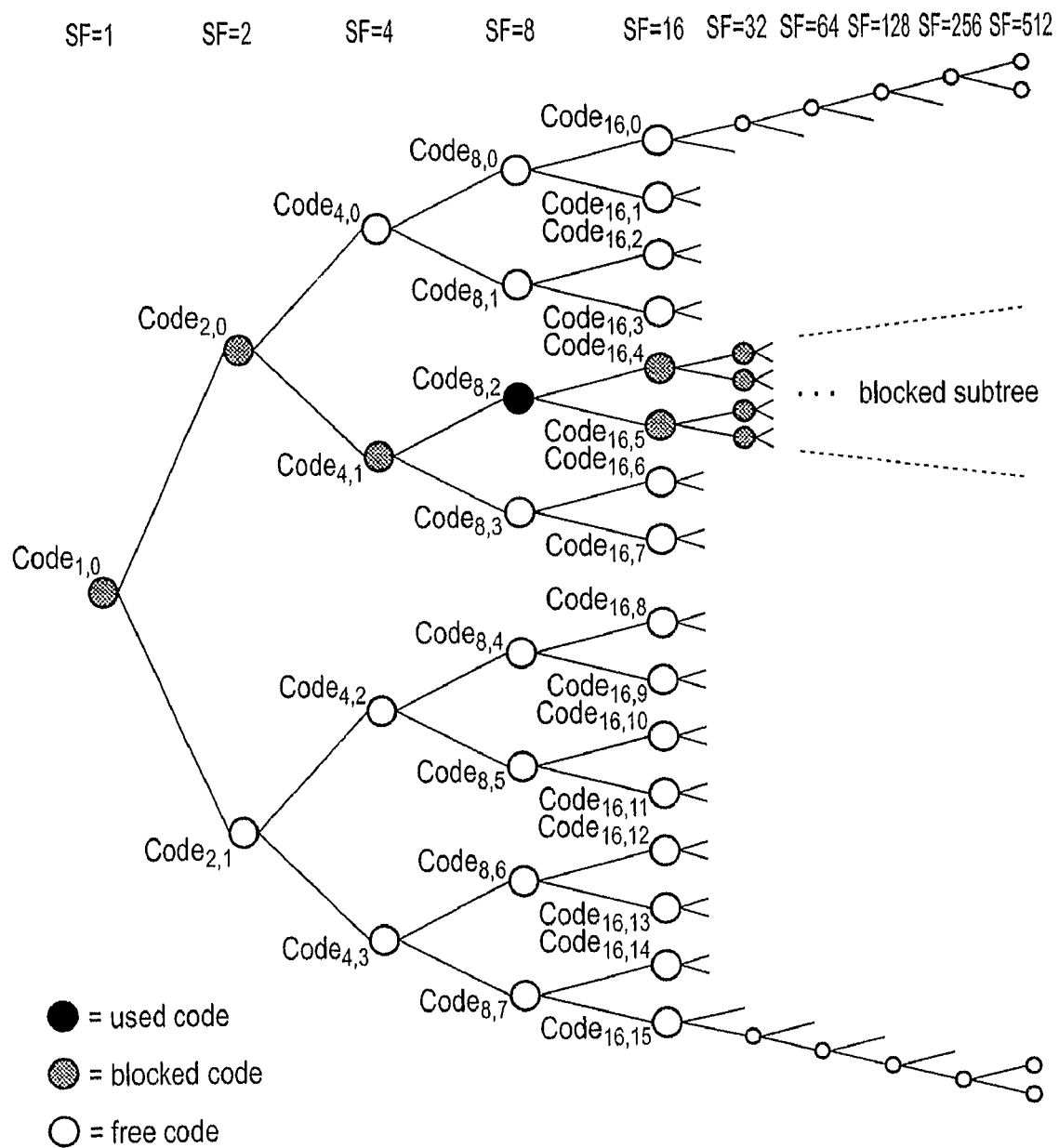
FIG. 1 illustrates an OVSF code tree.

OVSF spreading codes are arranged in a tree structure. This tree consists of nodes and each node details one spreading code. Each node has one parent, and two branches. These branches can also be seen as their own subtrees. The spreading codes in this tree structure are arranged in such a way that higher codes "mask" their own subtrees. For example (see FIG. 1), if code (8,2) is assigned to a user, it will not be possible to use codes (16,4) and (16,5) (or any code from their respective subtrees) simultaneously in the same cell, because those codes would not be orthogonal with code (8,2). Also, all parents of code (8,2) are blocked from use. In this document notation "code(m, n)" means a spreading code of spreading factor m (m=[1, 2, 4, 8, 16, 32, 64, 128, 256, 512] in this embodiment), and n indicates the number of the spreading code of that spreading factor ($0 \leq n \leq m$).

The blocked codes are unusable because they are not orthogonal with the assigned code. This means that if any of those codes is used simultaneously with the assigned code, the resulting data streams will severely interfere with each other.

If the receiver correlates the received signal with the correct spreading code, the result is the original signal. If the receiver correlates the received signal with a different (but still orthogonal) spreading code, the result is zero, assuming that the signal has not been distorted too much by interference. However, if the receiver correlates the received signal with a different code that is non-orthogonal with the correct code, then the result is non-zero, and the power level of the correlator output depends on how populated the subtree is with interfering codes.

In CDMA systems the system power budget in the downlink is allocated in principle in a way which guarantees all bits an equal energy level over the interference flow, i.e., $E_b/I_o$ should be constant This results in an arrangement where spreading factors and transmission powers are tightly combined. The spreading factor gives the relative transmit power in decibels, e.g., SF=128 will be sent using −21 dB power level compared to a SF=1 code, because $10 \log_{10}(128)=21$ dB. If a spreading factor is doubled, the required power level is correspondingly halved (i.e., reduced by 3 dB). Thus the receiver can easily conclude from the correlator power output level if the tested code is an interferer, or if the interferer is one of the tested code's descendents. This observation is exploited in the proposed interference cancellation scheme.

Figure 2:
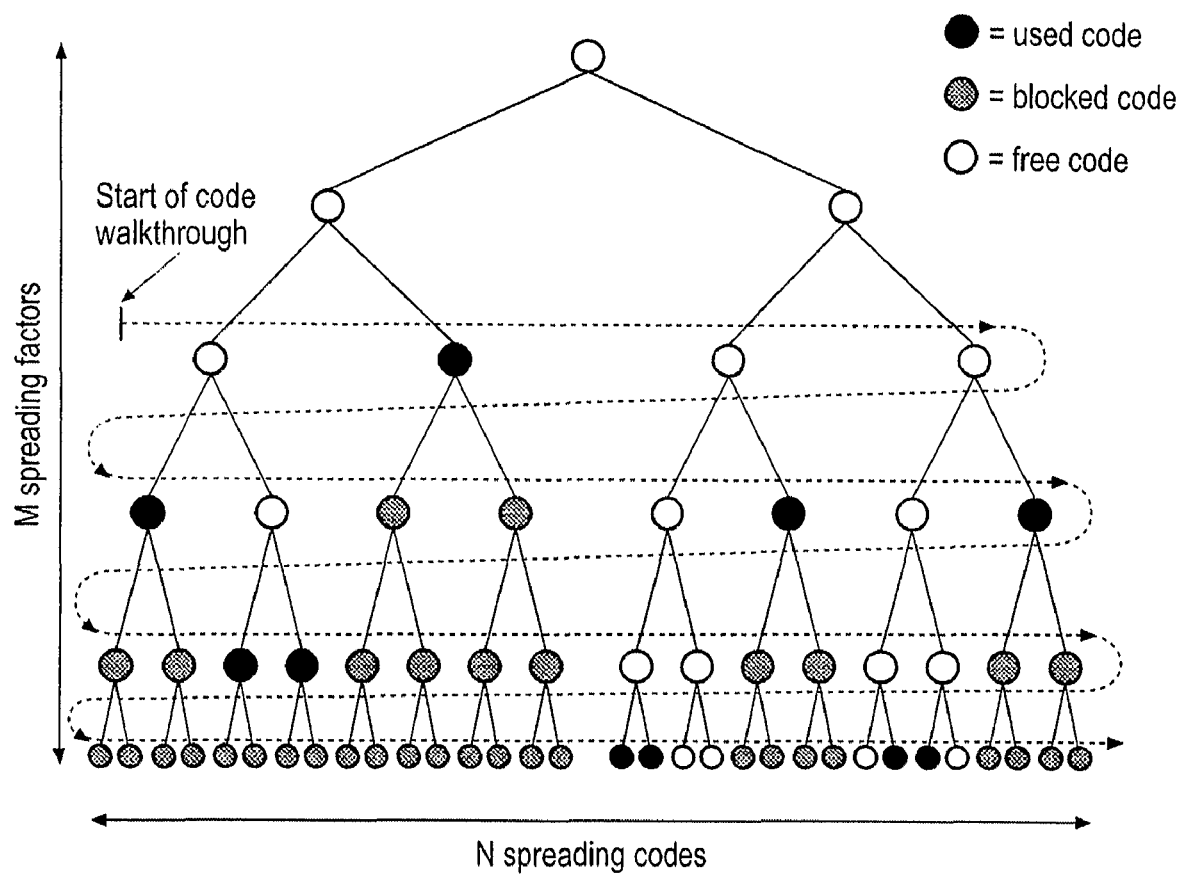
FIG. 2 illustrates a walk-through path for tracking usage of codes in the tree of FIG. 1.

The proposed scheme identifies the interfering codes by recursive walk-through of the code space. The idea is depicted in FIG. 2. The found interfering codes are used to regenerate the interfering signals, and these are then subtracted from the composite signal resulting in a signal with much less interference.

Figure 3:
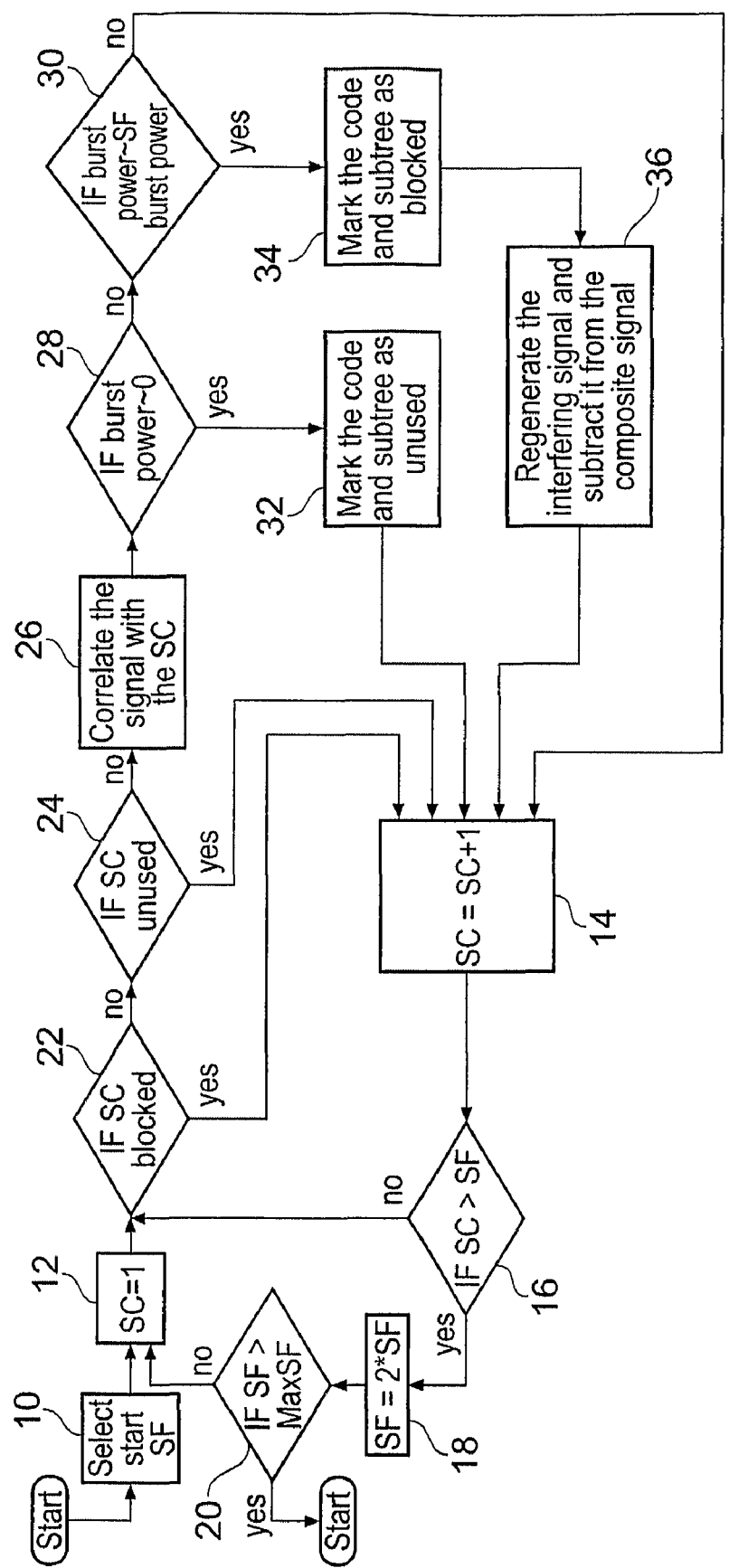
FIG. 3 illustrates a flow chart for a process of testing usage of codes in the tree of FIG. 1.

A flow chart of the code testing and interference removal scheme is depicted in FIG. 3. The spreading factor which starts the code search should be chosen to fit the system characteristics. For example in 3G-HSDPA systems SF=16 would be a good choice, because it is unlikely that a HSDPA system usually employs spreading factors lower than that. If it does employ such a code, it will not be a problem, because this method will then find all codes from the corresponding subtree. The algorithm is run until all subtrees are either blocked, known to be unused, or all leaf-nodes are tested.

According to the scheme shown in FIG. 3, in a receiver for a CDMA system using OVSF codes for multiplexing, the unknown codes used on a link are identified at the receiver by a recursive walk-through of the code space. Possible spreading codes are tested in the correlator one-by-one. If the tested code is identified as an interferer, it is marked as a used code and its whole code sub-tree is marked as blocked. This walk-through the code space is started from a low-spreading factor and continued until all codes are tested, are found to be blocked, or are known to be unused. The number of codes the correlator has to check is manageable, because:

1) Found interfering codes have their code subtrees blocked from further checking;
2) If the correlator output is close to zero, the code and its subtree are known to be unused, and thus need not be checked;
3) Low spreading-factor codes, which have many codes in their sub-trees, are tested first thus eliminating as many codes as possible early in the process.

The flow chart of FIG. 3 will now be described in more detail. In step 10, a starting value for SF is chosen. The value SF is the spreading factor and dictates the horizontal layer of the code tree at which the walk-through starts. Steps 12 and 14 control the progress of the walk-through of each code tree layer that is to be tested. The parameters SF and SC correspond to the parameters m and n mentioned in the introductory portion of this specification. In step 16, a decision is taken as to whether the process has reached the end of a layer of the code tree. If the end of such a layer is deemed to have been reached, the process moves to step 18 in which the process is moved down to the next layer of the code tree. Step 20 tests whether the final layer of the code tree has been processed. Steps 22 to 36 describe procedures that are performed during the testing of a node of the code tree and will now be discussed in greater detail.

Step 22 tests whether the OVSF code of the node under test is already marked as a blocked code by virtue of a code higher up the tree being marked as a used code. Step 24 tests whether the OVSF code of the node under test has been specifically marked as unused during the testing of a node further up the code tree. In step 26, the signal that is scheduled for interference reduction is correlated with the OVSF code of the node under test. Steps 28 and 30 evaluate the burst power of the result of that correlation process. In step 28, if the burst power of the correlation result is approximately nil, then the node and the nodes of any subtree depending from it are marked as unused OVSF codes. This deduction can be made because if the subtree of the node under test contained a used code it would not be orthogonal with the node under test and would therefore cause a non-zero correlation result. In step 30, the burst power of the correlation result is compared with the burst power that is to be expected for a used spreading code in the current layer of the code tree. If the burst power of the correlation result is approximately the same as the burst power that would be expected of a used code at the current level of the code tree, then the spreading code at the node under test is deemed to be a used code and all codes in the subtree depending from the code under test are deemed to be blocked codes. In step 36, the portion of the signal undergoing interference cancellation that is attributable to the spread spectrum signal using the OVSF code of the node under test is subtracted from the signal undergoing interference cancellation.

The proposed code search algorithm enables the use of multi-user detection techniques in the synchronous CDMA downlink. This is advantageous because it enables very efficient interference reduction in the UE receiver, and therefore improves its performance. The proposed interference characterisation and removal scheme is especially advantageous in high interference environments such as in MIMO systems, where it can increase the data throughput considerably.

Of course, many modifications can be made to the details of the scheme shown in FIG. 3. Some variants that offer reduced computational complexity without sacrificing too much performance will now be described.

In a first variant, the complexity is reduced by arranging that in each time frame, the code search algorithm first tries the spreading codes that were employed in the previous time frame, and after that performs a comprehensive search to only a small part of the code tree, such as one SF=8 subtree.

In a second variant, the complexity is reduced by arranging that the code search algorithm ignores high SF spreading codes, such as 128, 256, and 512, because they will cause less interference than low SF spreading codes. Furthermore, the receiver can identify the codes from an SF under test as interfering codes if their correlator output results in a burst which has a power level that is higher than half of the power level of a burst from a genuine interfering code of that spreading factor.

It may also be advantageous to keep in the active set such spreading codes as have been active in some of the previous frames, and not to remove them from the active set immediately when they are not used in the last frame tested, but only after a few frames of inactivity.

It may also be advantageous in a new frame to try previously employed spreading codes with high spreading factors first, because those are easiest to find from a noisy signal.

A further refinement to the proposed interference characterisation and removal scheme is to make it adaptive by applying it fully only when the perceived interference is very high, and conversely applying it only partly (perhaps using one of the variations noted above) or not at all when the perceived interference is low.

Figure 4:
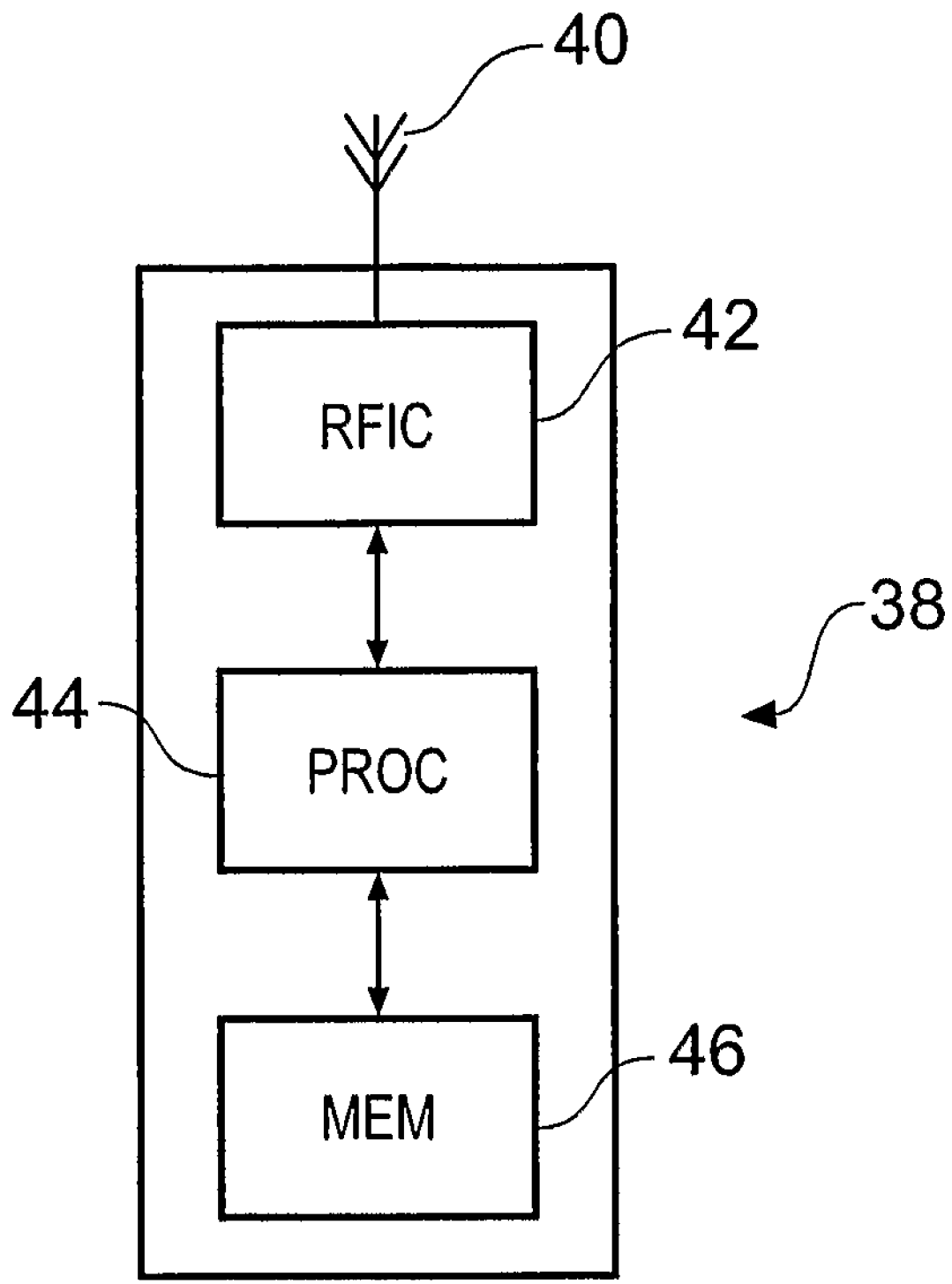
FIG. 4 illustrates a mobile telephone in which an interference characterisation and removal scheme of the kind described with reference to FIGS. 2 and 3 can be implemented.

FIG. 4 gives an overview of a mobile telephone that is suitable for implementing an interference characterisation and removal scheme of the kind that has been described with reference to FIGS. 2 and 3. FIG. 4 shows a mobile telephone, generally indicated 38, comprising an antenna 40, a radio frequency chip (hereinafter FRIC) 42, a data processor 44 and a memory 46. Only the key components that are strictly necessary for understanding the invention have been shown in FIG. 4; it will be apparent to the skilled person how a telephone of this type can be produced.

Signals are sent to and from the telephone 38 via the antenna 40. The antenna 40 exchanges singles with the FRIC 42. The FRIC 42 converts radio signals received at antenna 40 into base band signals for processing by processor 44 and provides the reverse conversion for signals travelling in the opposite direction. Many different types of processing are performed within processor 44 (often with the aid of memory 46), such as error protection coding, modulation and demodulation of data signals and calculation of signal to noise ratios, to name but a few. Software is loaded into the memory 46 that can be executed by the processor 44 to perform an interference characterisation and removal scheme of the kind described above with reference to FIGS. 2 and 3.

The invention claimed is:

1. A method of evaluating usage in a received signal of codes from a tree of codes adapted for use to orthogonalise communications signals, the method comprising:

testing to determine if a given code is in use in the received signal;

analyzing the testing and the tree to determine if a second testing of the received signal for additional codes in a portion of the tree depending from the given code is required;

concluding that the given code and its subtree codes are blocked from use if the given code is determined to be in use;

when the testing determines the given code is unused, making at least one prediction related to usage of codes in the portion based at least in part on a value indicative of a signal power associated with the given code; and for a given time frame, selecting, as the given code for testing, a code that was employed in a previous time frame, and then performing the method only on a subset of the codes from the tree of codes, wherein the method is applied upon a determination that the received signal is being subjected to a high level of interference.

2. A method of evaluating usage in a received signal of codes from a tree of codes adapted for use to orthogonalise communications signals, the method comprising:

testing to determine if a given code is in use in the received signal;

analyzing the testing and the tree to determine if a second testing of the received signal for additional codes in a portion of the tree depending from the given code is required;

concluding that the given code and its subtree codes are blocked from use if the given code is determined to be in use;

when the testing determines the given code is unused, making at least one prediction related to usage of codes in the portion based at least in part on a value indicative of a signal power associated with the given code, and when the given code has been determined to be in use, treating the given code as in use for a predetermined number of frames even after the given code is deemed to be not in use, wherein the method is applied upon a determination that the received signal is being subjected to a high level of interference.

3. An apparatus for evaluating usage in a received signal of codes from a tree of codes adapted for use to orthogonalise communications signals, the apparatus comprising:

means for testing to determine if a given code is in use in the received signal; and means for analyzing the testing and the tree to determine if a second testing of the received signal for additional codes in a portion of the tree depending from the given code is required;

wherein the means for analyzing is adapted to conclude that the given code and its subtree codes are blocked from use if the given code is determined to be in use, wherein the means for analyzing is adapted to make at least one prediction related to usage of codes in the portion based at least in part on a value indicative of a signal power associated with the given code where the given code is deemed unused, wherein, for a given time frame, the means for testing selects, as the given code, a code that was employed in a previous time frame, and the means for analyzing analyses only on a subset of the codes from the tree of codes, and wherein the apparatus is configured such that the means for testing and the means for analyzing are operated upon a determination that the received signal is being subjected to a high level of interference.

4. An apparatus for evaluating usage in a received signal of codes from a tree of codes adapted for use to orthogonalise communications signals, the apparatus comprising:
- means for testing to determine if a given code is in use in the received signal; and
- means for analyzing the testing and the tree to determine if a second testing of the received signal for additional codes in a portion of the tree depending from the given code is required;
- wherein the means for analyzing is adapted to conclude that the given code and its subtree codes are blocked from use if the given code is determined to be in use,
- wherein the means for analyzing is adapted to make at least one prediction related to usage of codes in the portion based at least in part on a value indicative of a signal power associated with the given code where the given code is deemed unused,
- wherein when the given code has been determined to be in use, treating the given code as in use for a predetermined number of frames even after the given code is deemed to be not in use, and
- wherein the apparatus is configured such that the means for testing and the means for analyzing are operated upon a determination that the received signal is being subjected to a high level of interference.

* * * * *